US010523829B2

(12) United States Patent
Iwase

(10) Patent No.: US 10,523,829 B2
(45) Date of Patent: Dec. 31, 2019

(54) IMAGE FORMING DEVICE AND CONTROL PROGRAM OF IMAGE FORMING DEVICE

(71) Applicant: KONICA MINOLTA, INC., Chiyoda-ku, Tokyo (JP)

(72) Inventor: Tomohiro Iwase, Fuchu (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/238,900

(22) Filed: Aug. 17, 2016

(65) Prior Publication Data
US 2017/0064105 A1    Mar. 2, 2017

(30) Foreign Application Priority Data

Aug. 27, 2015 (JP) ................. 2015-167725

(51) Int. Cl.
*G06F 3/13* (2006.01)
*H04N 1/00* (2006.01)

(52) U.S. Cl.
CPC ..... *H04N 1/00464* (2013.01); *H04N 1/00204* (2013.01); *H04N 1/00411* (2013.01); *H04N 1/00506* (2013.01); *H04N 1/00973* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| 6,857,122 B1 | 2/2005 | Takeda et al. | |
|---|---|---|---|
| 2012/0327443 A1 | 12/2012 | Fujii | |
| 2013/0067301 A1* | 3/2013 | Suzuki | G06F 16/9554 715/201 |
| 2013/0242345 A1* | 9/2013 | Kozaki | H04N 1/0097 358/1.15 |
| 2014/0022590 A1* | 1/2014 | Matsuda | G06F 3/1273 358/1.15 |

(Continued)

FOREIGN PATENT DOCUMENTS

| CN | 103581475 A | 2/2014 |
|---|---|---|
| JP | 2001-051860 A | 2/2001 |

(Continued)

OTHER PUBLICATIONS

Office Action (Notice of Reasons for Rejection) dated Sep. 5, 2017, by the Japanese Patent Office in corresponding Japanese Patent Application No. 2015-167725, and an English Translation of the Office Action. (11 pages).

(Continued)

*Primary Examiner* — Huo Long Chen
(74) *Attorney, Agent, or Firm* — Buchanan Ingersoll & Rooney PC

(57) ABSTRACT

An image forming device includes: a first display function unit which displays screen data to be displayed on a screen of an operating unit as a remote panel screen on a browser; a second display function unit which displays a content screen in a data description language on the browser; and a third display function unit which displays the remote panel screen and the content screen in the browser in a split manner.

14 Claims, 14 Drawing Sheets

(56) References Cited

U.S. PATENT DOCUMENTS

| | | | | |
|---|---|---|---|---|
| 2014/0029049 A1* | 1/2014 | Takahashi | .......... | H04N 1/00973 |
| | | | | 358/1.15 |
| 2014/0362401 A1* | 12/2014 | Yamashita | ......... | H04N 1/00503 |
| | | | | 358/1.15 |
| 2015/0070398 A1* | 3/2015 | Tomono | ............. | H04N 1/00413 |
| | | | | 345/666 |
| 2015/0146255 A1* | 5/2015 | Shintani | ................ | G06F 3/0481 |
| | | | | 358/1.15 |

FOREIGN PATENT DOCUMENTS

| | | | |
|---|---|---|---|
| JP | 2008-294820 | A | 12/2008 |
| JP | 2009-159376 | A | 7/2009 |
| JP | 2013-008279 | A | 1/2013 |
| JP | 2015-082148 | A | 4/2015 |
| JP | 2015-106719 | A | 6/2015 |
| JP | 2015-118566 | A | 6/2015 |
| JP | 2015-172875 | A | 10/2015 |

OTHER PUBLICATIONS

First Office Action dated Jun. 4, 2018, by the State Intellectual Property Office of the People's Republic of China in Chinese Patent Application No. 201610705281.X (13 pages).
Second Office Action dated Feb. 1, 2019, by the Chinese Patent Office in corresponding Chinese Patent Application No. 201610705281.X, and an English Translation of the Office Action. (16 pages).

* cited by examiner

FIG. 4

USER MANUAL

1. COPYING FUNCTION 1-1. ORIGINAL SETTING 1-2. MAGNIFICATION SETTING 1-3. APPLIED SETTING

2. PRINTING FUNCTION

FIG. 10
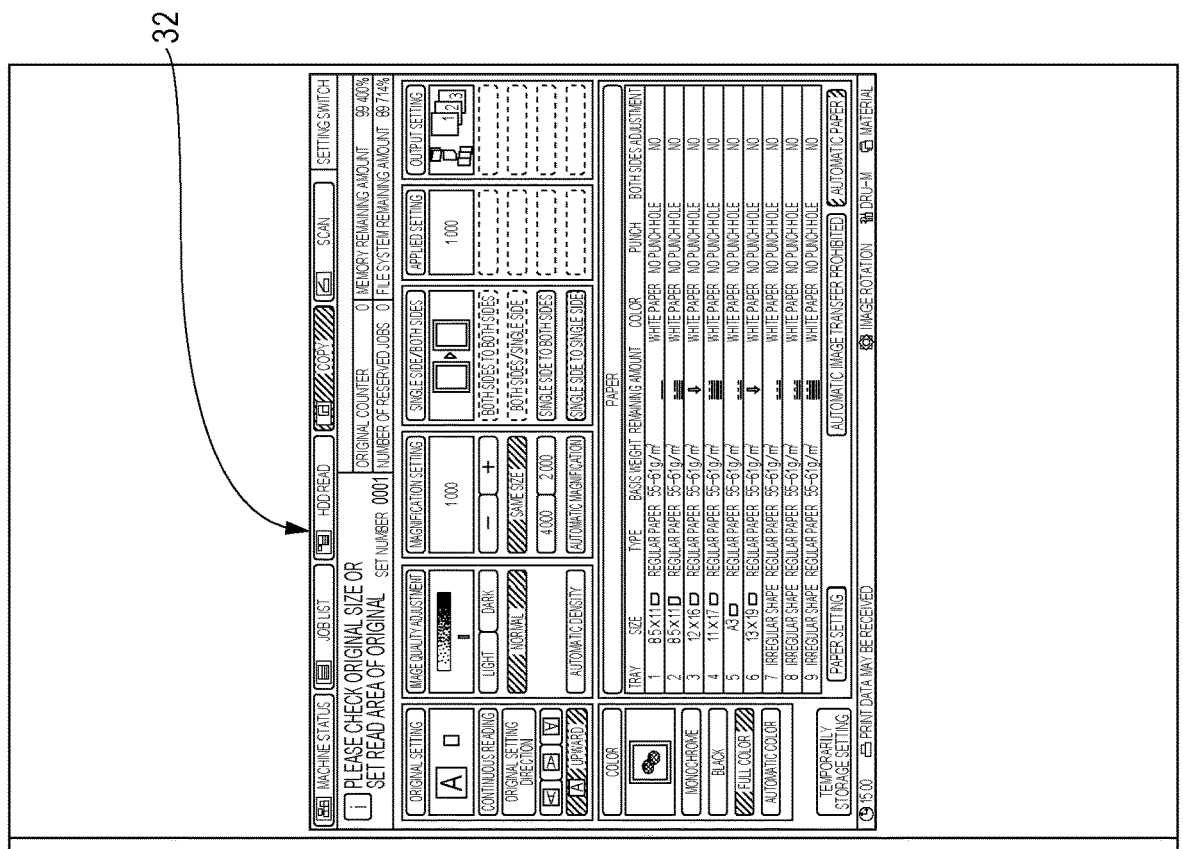
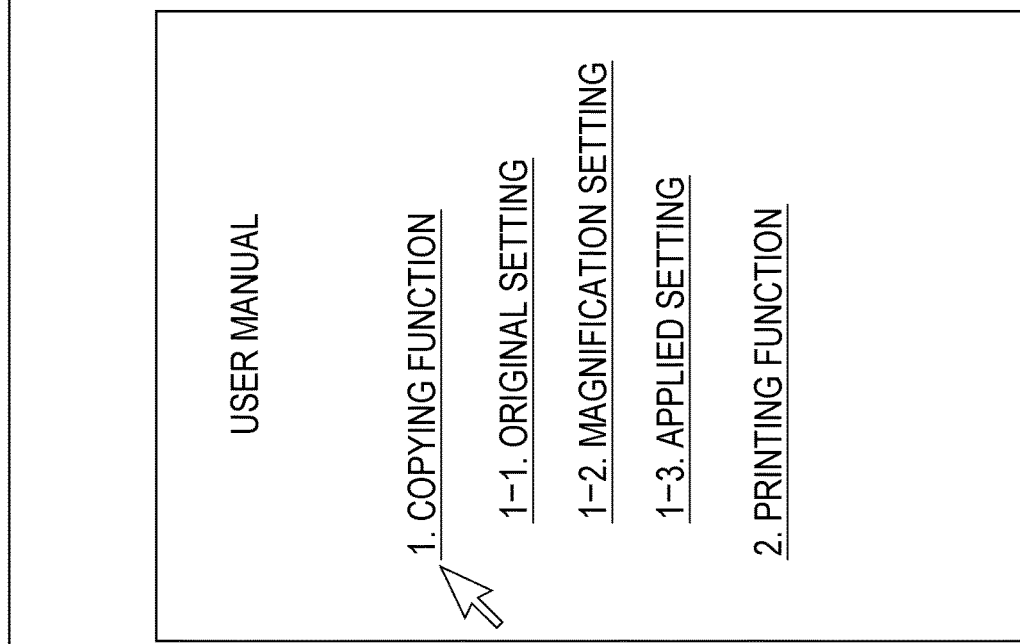

FIG. 11

| | | R101 | R102 | R103 | R104 | R105 | R112 |
|---|---|---|---|---|---|---|---|
| | | MACHINE STATUS | JOB LIST | HDD READ | COPY | SCAN | SETTING SWITCH |

PLEASE CHECK ORIGINAL SIZE OR SET READ AREA OF ORIGINAL    SET NUMBER 0001

| ORIGINAL COUNTER | 0 | MEMORY REMAINING AMOUNT | 99.400% |
|---|---|---|---|
| NUMBER OF RESERVED JOBS | 0 | FILE SYSTEM REMAINING AMOUNT | 89.714% |

ORIGINAL SETTING

A

CONTINUOUS READING

ORIGINAL SETTING DIRECTION

▲ UPWARD

IMAGE QUALITY ADJUSTMENT

LIGHT    DARK

NORMAL

AUTOMATIC DENSITY

MAGNIFICATION SETTING

1.000

− +

SAME SIZE 4.000   2.000

AUTOMATIC MAGNIFICATION

SINGLE SIDE/BOTH SIDES

BOTH SIDES TO BOTH SIDES
BOTH SIDES/SINGLE SIDE
SINGLE SIDE TO BOTH SIDES
SINGLE SIDE TO SINGLE SIDE

APPLIED SETTING

1.000

OUTPUT SETTING

COLOR

MONOCHROME
BLACK
FULL COLOR
AUTOMATIC COLOR

PAPER

| TRAY | SIZE | TYPE | BASIS WEIGHT | REMAINING AMOUNT | COLOR | PUNCH | BOTH SIDES ADJUSTMENT |
|---|---|---|---|---|---|---|---|
| 1 | 8.5×11 | REGULAR PAPER | 55–61g/m² | | WHITE PAPER | NO PUNCH HOLE | NO |
| 2 | 8.5×11 | REGULAR PAPER | 55–61g/m² | ⇒ | WHITE PAPER | NO PUNCH HOLE | NO |
| 3 | 12×16 | REGULAR PAPER | 55–61g/m² | | WHITE PAPER | NO PUNCH HOLE | NO |
| 4 | 11×17 | REGULAR PAPER | 55–61g/m² | ⇒ | WHITE PAPER | NO PUNCH HOLE | NO |
| 5 | A3 | REGULAR PAPER | 55–61g/m² | | WHITE PAPER | NO PUNCH HOLE | NO |
| 6 | 13×19 | REGULAR PAPER | 55–61g/m² | | WHITE PAPER | NO PUNCH HOLE | NO |
| 7 | IRREGULAR SHAPE | REGULAR PAPER | 55–61g/m² | | WHITE PAPER | NO PUNCH HOLE | NO |
| 8 | IRREGULAR SHAPE | REGULAR PAPER | 55–61g/m² | | WHITE PAPER | NO PUNCH HOLE | NO |
| 9 | IRREGULAR SHAPE | REGULAR PAPER | 55–61g/m² | | WHITE PAPER | NO PUNCH HOLE | NO |

PAPER SETTING    AUTOMATIC IMAGE TRANSFER PROHIBITED    AUTOMATIC PAPER

TEMPORARILY STORAGE SETTING

15:00    PRINT DATA MAY BE RECEIVED    IMAGE ROTATION    DRU-M    MATERIAL

FIG. 12

IMAGE FORMING DEVICE AND CONTROL PROGRAM OF IMAGE FORMING DEVICE

The entire disclosure of Japanese Patent Application No. 2015-167725 filed on Aug. 27, 2015 including description, claims, drawings, and abstract are incorporated herein by reference in its entirety.

BACKGROUND OF THE INVENTION

Field of the Invention

The present invention relates to an image forming device and a control program of the image forming device.

Description of the Related Art

There is technology of remotely operating an image forming device by using a portable terminal (for example, refer to JP 2015-82148 A). JP 2015-82148 A discloses technology of changing a display size according to priority levels of an operating unit and a numeric keypad to display in a remote panel (remote operating image) in which the operating unit and the numeric keypad of the image forming device are simultaneously displayed on the portable terminal.

Recently, in an image forming device such as a copying machine, a printer device, a printing machine, a multifunction machine and the like, along with computerization of a paper document (paper medium), instructions such as a user manual are also computerized and may be checked on a screen of an operating unit of the device. However, since only one screen is generally displayed on the operating unit, when the instructions such as the user manual are displayed on the screen of the operating unit, an operating screen cannot be checked. Therefore, operation heretofore performed while looking at the paper document to operate the operating unit while looking at the instructions such as the user manual cannot be performed. When advertising and a screen saver are displayed on the screen of the operating unit when the operating unit is riot operated, a display status cannot be checked. The conventional technology disclosed in JP 2015-82148 A does not take such a problem into consideration and it is not possible to operate the operating unit while looking at the instructions such as the user manual.

SUMMARY OF THE INVENTION

Therefore, an object of the present invention is to provide an image forming device and a control program of the image forming device enabling operation and browsing of the operating unit while looking at a content screen in a data description language.

To achieve the abovementioned object, according to an aspect, an image forming device reflecting one aspect of the present invention comprises a first display function unit which displays screen data to be displayed on a screen of an operating unit as a remote panel screen on a browser;

a second display function unit which displays a content screen in a data description language on the browser; and a third display function unit which displays the remote panel screen and the content screen in the browser in a split manner.

To achieve the abovementioned object, according to an aspect, there is provided a non-transitory recording medium storing a computer readable control program of an image forming device, reflecting one aspect of the present invention, allowing a computer to execute:

a process of displaying screen data to be displayed on a screen of an operating unit on a browser as a remote panel screen;

a process of displaying a content screen in a data description language on the browser; and a process of displaying the remote panel screen and the content screen in the browser in a split manner.

In the image forming device or the control program thereof configured as above, it is possible to operate on the remote panel screen while looking at the instructions such as the user manual on the content screen by displaying the remote panel screen and the content screen in the data description language in the browser in a split manner. The content in the data description language is not limited to the user manual; a service assistant tool, an advertising display screen saver and the like can be included. In addition to the user manual.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is a view illustrating a display example of a first example in which a user manual screen and a remote panel screen are displayed in a split manner;

FIG. 10 is a view illustrating a display example of a second example (1) in which operation related to a remote panel screen is linked with operation related to a user manual screen;

FIG. 11 is an enlarged view illustrating a setting screen of a copying function being another example of the remote panel screen;

FIG. 12 is a view illustrating a display example of a second example (2) in which the operation related to the user manual screen is linked with the operation related to the remote panel screen;

DESCRIPTION OF THE PREFERRED EMBODIMENTS

Figure 1:
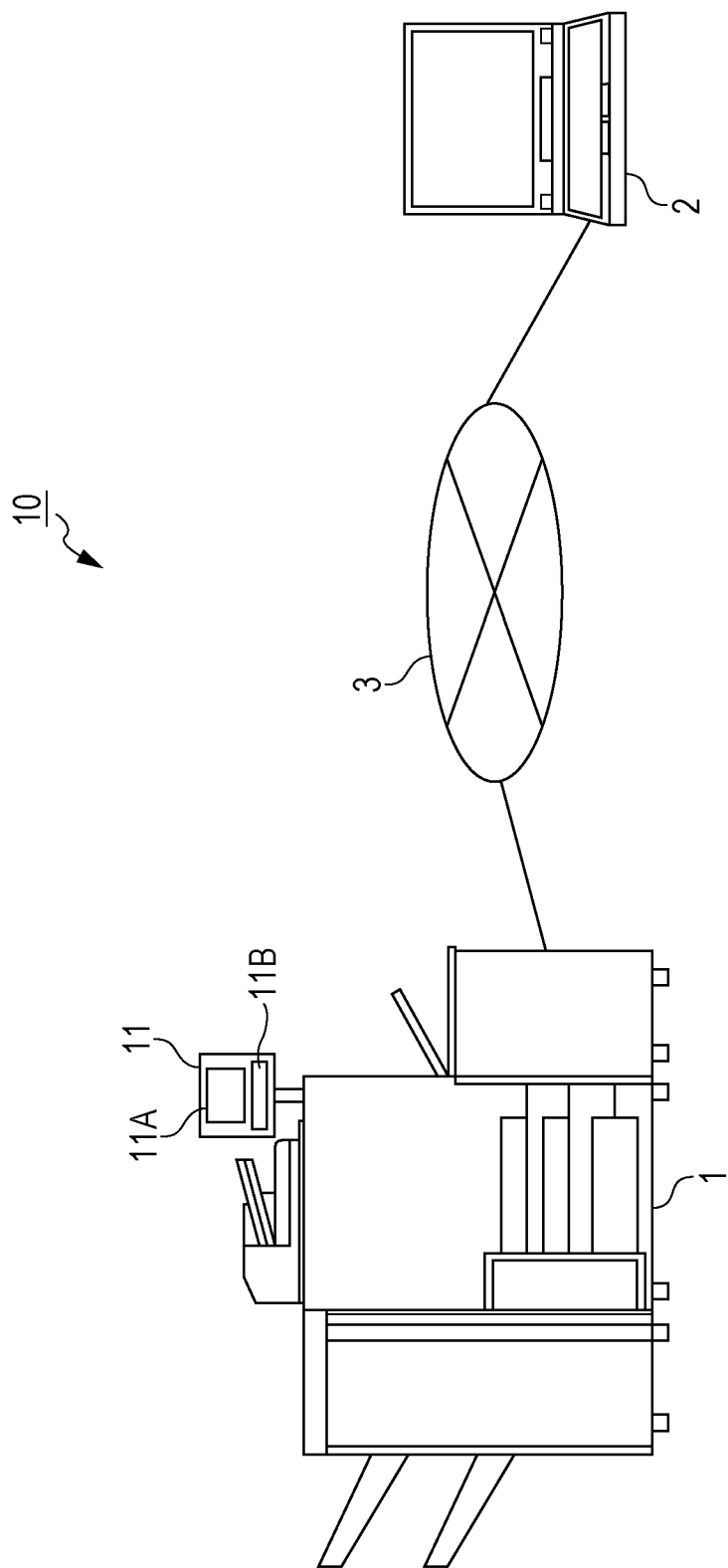
FIG. 1 is a system configuration diagram illustrating an example of a configuration of a network system including an image forming device according to an embodiment of the present invention.

Hereinafter, a mode for carrying out the present invention (hereinafter, referred to as an "embodiment") will be described in detail with reference to the drawings. However, the scope of the invention is not limited to the illustrated examples. Meanwhile, in the following description and drawings, the same element or the element having the same function is assigned with the same reference numeral and the description thereof is not repeated.

[Network System]

FIG. 1 is a system configuration diagram illustrating an example of a configuration of a network system including an image forming device of the present invention. As illustrated in FIG. 1, a network system 10 is configured such that an image forming device 1 of the present invention and a client PC (personal computer) 2 being an example of a terminal device may communicate with each other through a communication line 3. A public line, a private line, the Internet, a LAN (local area network) line and the like are examples of the communication line 3.

A copying machine, a printer device, a printing machine, a multifunction machine and the like are examples of the image forming device 1. The multifunction machine also referred to as an MFP (multifunction peripheral) is a device having a plurality of different functions such as functions of copying, printing, faxing, and scanning, for example. The image forming device 1 is provided with an operating unit 11.

Although an example in which the operating unit 11 is arranged so as to projecting above the image forming device 1 is herein illustrated, it is also possible to arrange the same on an upper surface of the image forming device 1 in a planar manner (flatly). The operating unit. Is formed of a touch panel 11A formed of a panel-type display such as a liquid crystal device and an organic EL (electroluminescence) display and a hard key 11B, for example.

[Configuration of Control System of Image Forming Device]

Figure 2:
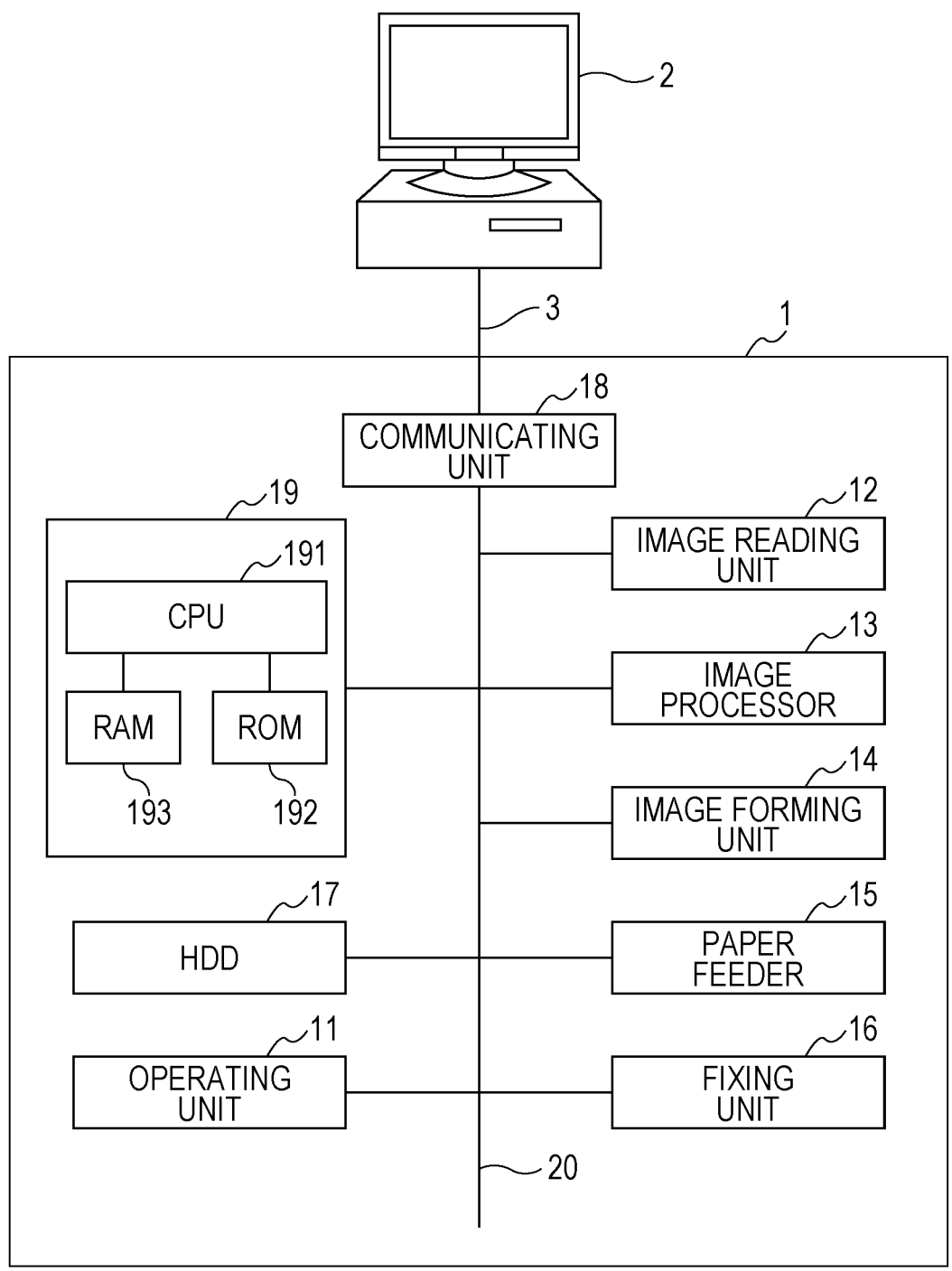
FIG. 2 is a block diagram illustrating a configuration of a control system of the image forming device according to the embodiment of the present invention.

A configuration of a control system of the image forming device 1 of the present invention is next described with reference to FIG. 2. FIG. 2 is a block diagram illustrating the configuration of the control system of the image forming device 1 of the present invention.

The image forming device 1 is provided with an image reading unit 12, an image processor 13, an image forming unit 14, a paper feeder 15, a fixing unit 16, a HDD 17, a communicating unit 18, and a main body controller 19 in addition to the operating unit 11. The operating unit 11, the image reading unit 12, the image processor 13, the image forming unit 14, the paper feeder 15, the fixing unit 16, the HDD 17, the communicating unit 18, and the main body controller 19 are connected to a system bus 20.

The image reading unit 12 reads an image of an original put on an original platen and performs A (analog)/D (digital) conversion on read image information to generate image data. The image data generated by the image reading unit 12 is supplied to the image processor 13. The image processor 13 performs image processing such as shading correction, image density adjustment, and image compression as needed on the image data created by the image reading unit 12 through the A/D conversion. Meanwhile, the image data is not limited to the data output from the image reading unit 12; this may also be data received from an external device such as the client PC 2 and another image forming device connected to the image forming device 1.

The image forming unit 14 receives the image data on which the image processing is performed by the image processor 13 and forms an image on paper being a recording medium fed from the paper feeder 15 based on the image data. The fixing unit 16 pressurizes and heats the paper to fix a toner image transferred to the paper by the image forming unit 14 on the paper. The HDD 17 stores the image data of the original image obtained by reading by the image reading unit 12 or stores the already output image data and the like.

The communicating unit 18 receives job information transmitted from the client PC 2 being an external information processing device through the communication line 3 and transmits the received job information to the main body controller 19 through the system bus 20. The job information includes the image data of the image to be formed and information such as a type of paper and the number of sheets of paper to be used associated with the image data.

The main body controller 19 includes a CPU (central processing unit) 191, a ROM (read only memory) 192 for storing a program and the like to be executed by the CPU 191, and a RAM (random access memory) 193 used as a working area of the CPU 191, for example. Meanwhile, an electrically erasable programmable ROM may be used, for example, as the ROM 192.

The main body controller 19 is connected to the operating unit 11, the image reading unit 12, the image processor 13, the image forming unit 14, the paper feeder 15, the fixing unit 16, the HDD 17, and the communicating unit. 18 through the system bus 20 to control an entire image forming device 1.

[Example of Function Configuration of Main Body Controller]

Figure 3:
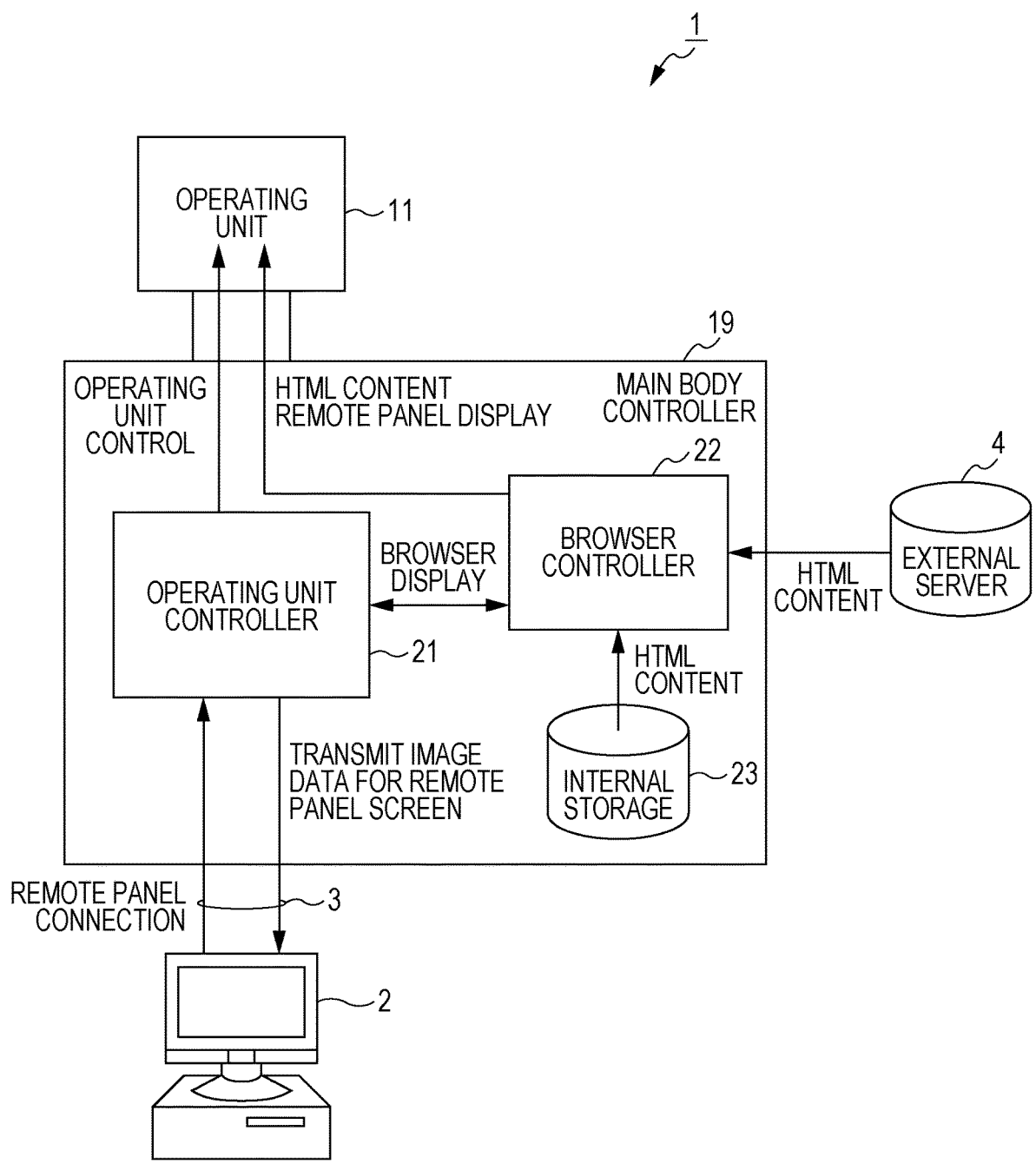
FIG. 3 is a function block diagram illustrating an example of a configuration of a function on system of a main body controller in the control system of the image forming device according to the embodiment of the present invention.

A function system which controls the operating unit 11 out of various function systems included in the main body controller 19 is next described with reference to FIG. 3. FIG. 3 is a function block diagram illustrating an example of a configuration of the function system of the main body controller 19 in the control system of the image forming device 1 of the present invention.

As illustrated in FIG. 3, the main body controller 19 is configured to include an operating unit controller 21 which controls the operating unit 11, a browser controller 22 which controls a browser (built-in browser mounted on the image forming device 1), and an internal storage 23. In the main body controller 19, the operating unit controller 21 and the browser controller 22 are functional units having a function of controlling the operating unit 11 and a function of controlling the browser under the control of the CPU 191 (refer to FIG. 2)

The operating unit 11 generally displays an operating panel screen under the control of the operating unit controller 21; however, this performs browser display (displays a browser screen) on a full screen when the browser controller 22 starts the browser. At the time of the browser display, the operating panel screen is generally set in a lower layer than the browser screen. Therefore, at the time of the browser display, the operating panel screen is not displayed.

The browser controller 22 displays a content screen in the browser based on content information in a data description language stored in the internal storage 23 being an internal storage device and an external server 4 being an external storage device. HTML (hypertext markup language) is widely known as the data description language. Hereinafter, the content in HTML being an example of the data description language is referred to as "HTML content". A display screen based on the HTML content is referred to as an "HTML content screen".

The system illustrated in FIG. 3 in which the image forming device 1 is connected to the client PC 2 through the communication line 3 is a remote panel system utilizing VNC (virtual network computing: registered trademark) being software for remotely operating a screen of another device connected to the network, for example. That is to say, a function of a remote panel is a function of remotely operating the image forming device 1 connected through the communication line 3 such as the LAN line.

Specifically, when the operating unit controller 21 is connected to the client PC 2 connected through the communication line 3 by remote panel connection, this generates an image for remote panel display in addition to screen display for the operating unit 11, that is to say, display of a remote panel screen and transmits the same to the client PC 2. Then, the client PC 2 displays the image transmitted from the operating unit controller 21 on the browser. According to this, it becomes possible to browse/operate the operating unit 11 from the remote client PC 2.

In an environment in which the browser mounted on the image forming device 1 may be used, the remote panel may use the browser. Therefore, in the image forming device 1, when the browser is started on the operating unit 11, the remote panel screen may be displayed also on the operating unit 11.

[Embodiment of Present Invention]

An image forming device 1 according to an embodiment of the present invention is provided with the following function unit in consideration of the fact that a remote panel screen may be displayed also on an operating unit 1 when a browser is started on the operating unit 11. That is to say, the image forming device 1 according to this embodiment is provided with a first display function unit which displays screen data to be displayed on a screen of the operating unit 11 as the remote panel screen on the browser and a second display function unit which displays an HTML content screen on the browser. The image forming device 1 according to this embodiment is further provided with a third display function unit which displays the remote panel screen and the HTML content screen in a split manner in the browser.

The above-described first, second, and third display function units are functions executed under the control of an operating unit controller 21 and a browser controller 22 being function units of a main body controller 19 in FIG. 3. By displaying the remote panel screen and the HTML content screen in a split manner in the browser under the control of the operating unit controller 21 and the browser controller 22, it is possible to operate and browse the operating unit 11 on the remote panel screen while looking at instructions such as a user manual on the HTML content screen. The HTML content screen at that time is the content screen related to the operation of the remote panel screen.

It is also possible to link operation of the HTML content with the operation of the operating unit 11, so that a user-friendly user manual which does not require troublesome operation may be provided. A method of determining whether to link the operation of the HTML content with the operation of the operating unit 11 by using a flag and the like indicating whether the link is necessary may be used as an example.

A specific example of displaying the remote panel screen and the HTML content screen in a split manner in the browser in the image forming device 1 according to this embodiment is hereinafter described.

FIRST EXAMPLE

A first example is an example of a case in which a user manual screen and a remote panel screen are displayed in a split manner. FIG. 4 illustrates a display example of the first example in which the user manual screen and the remote panel screen are displayed in a split manner.

When a user starts a user manual, a user manual screen 31 being an example of an HTML content screen is displayed on a browser. At that time, when the user presses a specific key of a hard key 11B (refer to FIG. 1), for example, in an operating unit 11, the browser is displayed so as to be split into two frames. Specifically, as illustrated in FIG. 4, the user manual screen 3 is displayed. On one part of half-split display and a remote panel screen 32 is displayed on the other. According to this, the user manual screen. 31 and a screen of the operating unit 11 (that is to say, the remote panel screen 32) may be simultaneously browsed.

Figure 5:
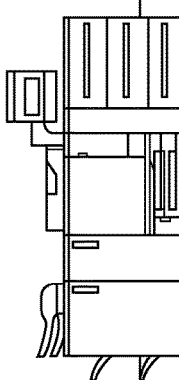
FIG. 5 is an enlarged view illustrating a default screen of an operating unit being an example of the remote panel screen.

FIG. 5 illustrates an example of the remote panel screen 32 in FIG. 4 in an enlarged manner. The remote panel screen 32 herein illustrated is a default screen, for example, of the operating unit 11. The default screen includes an information display area R101, setting screen transition area R102 to R111, and a simple setting area R112. The information display area R101 displays information related to an image forming device 1. Specifically, the information display area R101 displays information related to an input job, information related to supplied/discarded member (toner, punch waste, staple and the like), information related to paper (size, name, weight, remaining amount and the like of the paper) and the like, for example.

Each of the setting screen transition areas R102 to R111 is the area for transition to a setting screen for setting a predetermined operation condition. For example, pressing a "copy" area R104 makes a transition to the setting screen of a copying function and pressing an "automatic reset setting" area R111 makes a transition to the setting screen of an automatic resetting function. The simple setting area R112 is the area for simply setting the operation condition of the image forming device 1 for a predetermined specified function. The user may set the operation condition by operating the simple setting area R112 without performing the setting operation of the operation condition by the setting screen of the operation condition.

Meanwhile, the display example of the remote panel screen 32 herein illustrated is merely an example and this is not limited to this display example.

Although simultaneous display (half-split display) of the remote panel and the user manual is described as an example in this example, the user manual as the HTML content is merely an example. In addition to the user manual, a service assistant tool, an advertising display screen saver and the like may also be handled as the HTML content simultaneously displayed with the remote panel, for example.

Figure 6:
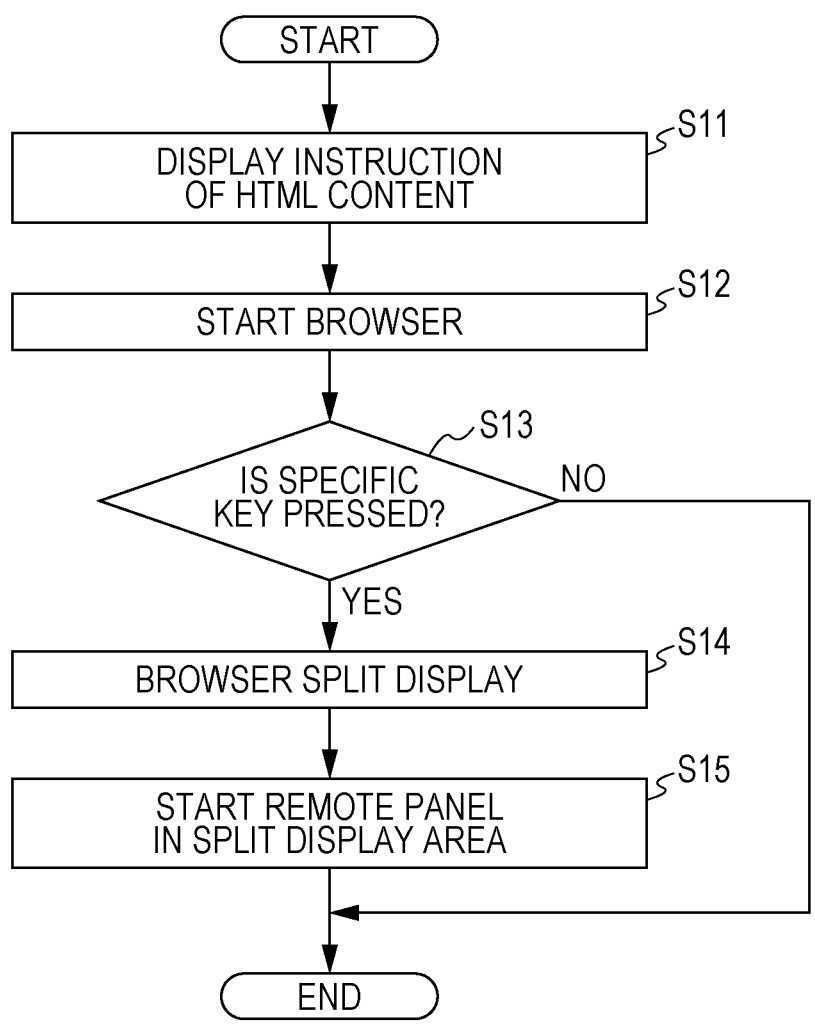
FIG. 6 is a flowchart illustrating an example of a procedure of a displaying process of the first example in which the user manual screen and the remote panel screen are displayed in a split manner.

FIG. 6 is a flowchart illustrating an example of a procedure of a displaying process of the first example in which the user manual screen 31 and the remote panel screen 32 are displayed in a split manner. The displaying process is executed under the control of a CPU 191 of a main body controller 19 (refer to FIG. 2)

When the CPU 191 receives an instruction to display the HTML content screen by manual operation by the user (step S11), this starts the browser (built-in browser) of the image forming device 1 to display the user manual screen 31 (step S12) Subsequently, the CPU 191 determines whether the specific key of the hard key 11B in the operating unit 11 (refer to FIG. 1) is pressed by the user (step S13). Herein, when the user presses the specific key of the hard key 11B, it is determined that the instruction to display in a split manner is issued. That is to say, the process at step S13 is a process of determining whether there is the instruction to display in a split manner.

The CPU 191 finishes a series of processes for displaying in a split manner when the user does not press the specific key (NO at S13). When the specific key is pressed (YES at S13), the CPU 191 displays the user manual screen 31 and the remote panel screen 32 in a split manner on the browser (step S14), starts the remote panel and displays the remote panel screen 32 on a split display area (step S15), and thereafter finishes a series of processes for displaying in a split manner.

Screen display of the operating unit 11 in the remote panel is displayed based on image data (screen data) Therefore, the remote panel screen 32 in the split display is easily scaled. Therefore, an attribute related to a screen display ratio such as "HTML content-oriented", "remote panel-oriented", and "same ratio", for example, is added to an HTML tag and the like for each page of the user manual. By adding the attribute related to the screen display ratio for each page of the user manual in this manner, it is possible to change the screen display ratio between the user manual screen 31 and the remote panel screen 32.

For the image forming device 1 similarly, it is also possible to add information of the ratio of the screen display to an internal storage 23 (refer to FIG. 3) by using "HTML content-oriented" and "remote panel-oriented", According to this, the user may arbitrarily set the screen display ratio between the user manual screen 31 and the remote panel screen 32 on the remote panel.

Figure 7:
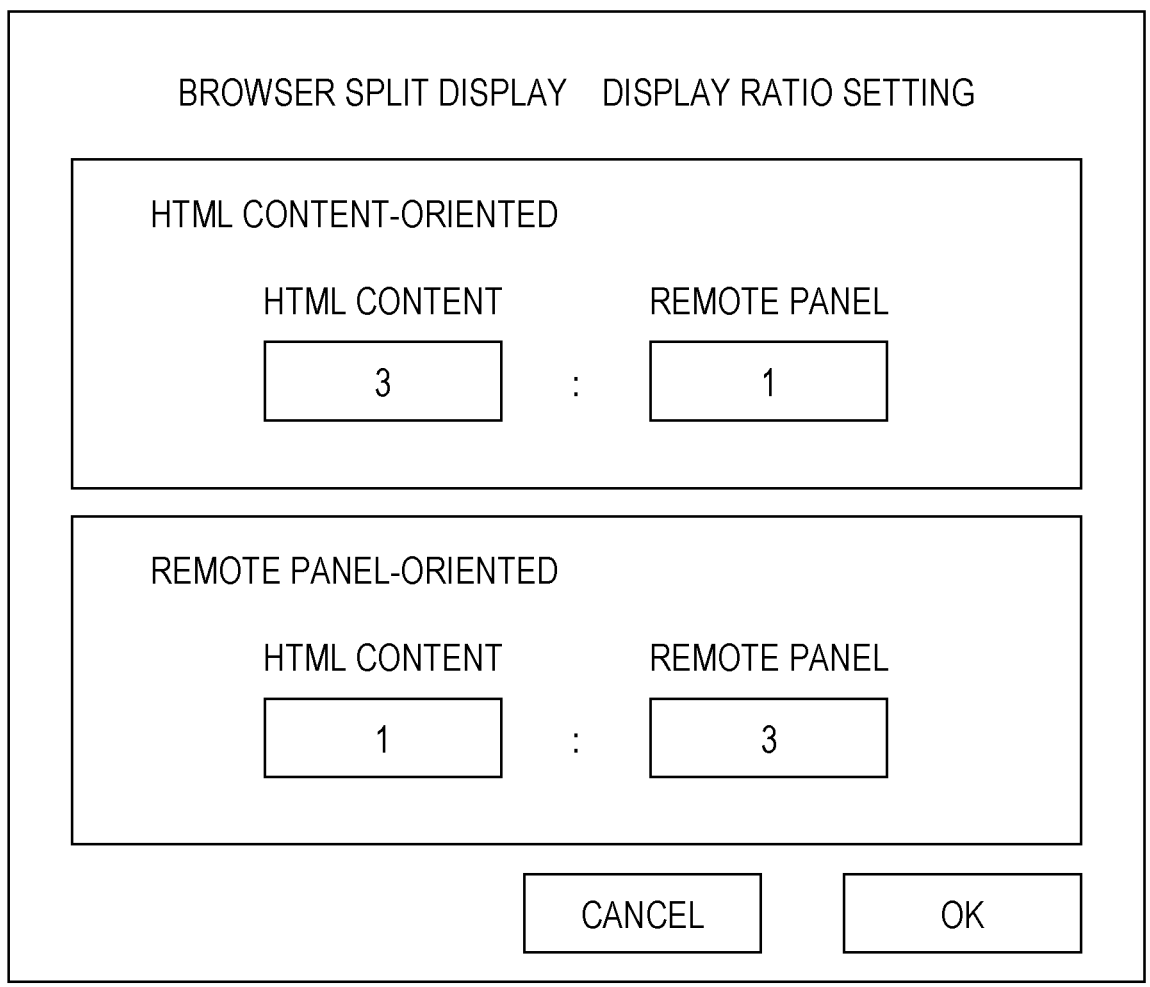
FIG. 7 is a view illustrating a setting screen of a screen display ratio at the time of browser split display.

FIG. 7 illustrates a setting screen of the screen display ratio at the time of browser split display. As illustrated in FIG. 7, the screen display ratio is determined in advance for each attribute of "HTML content-oriented" and "remote panel-oriented". It is also possible to configure such that the user may change the screen display ratio determined in advance for each attribute to an arbitrary value. In this case, in FIG. 3, for example, the main body controller 19 may perform a process of changing the screen display ratio to an arbitrary value according to an instruction by the user from the operating unit 11.

Figure 8:
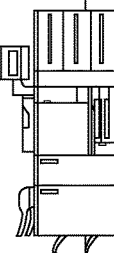
FIG. 8 is a view illustrating a display example of split display in a case of "remote panel-oriented"

In FIG. 7, the screen display ratio between the HTML content and the remote panel is set to 3:1 in "HTML content-oriented", and the screen display ratio between the HTML content and the remote panel is set to 1:3 in "remote panel-oriented". However, the screen display ratio is merely an example and there is no limitation. FIG. 8 illustrates a display example of the split display at the time of "remote panel-oriented", that is to say, when the screen display ratio between the HTML content and the remote panel is 1:3.

Figure 9:
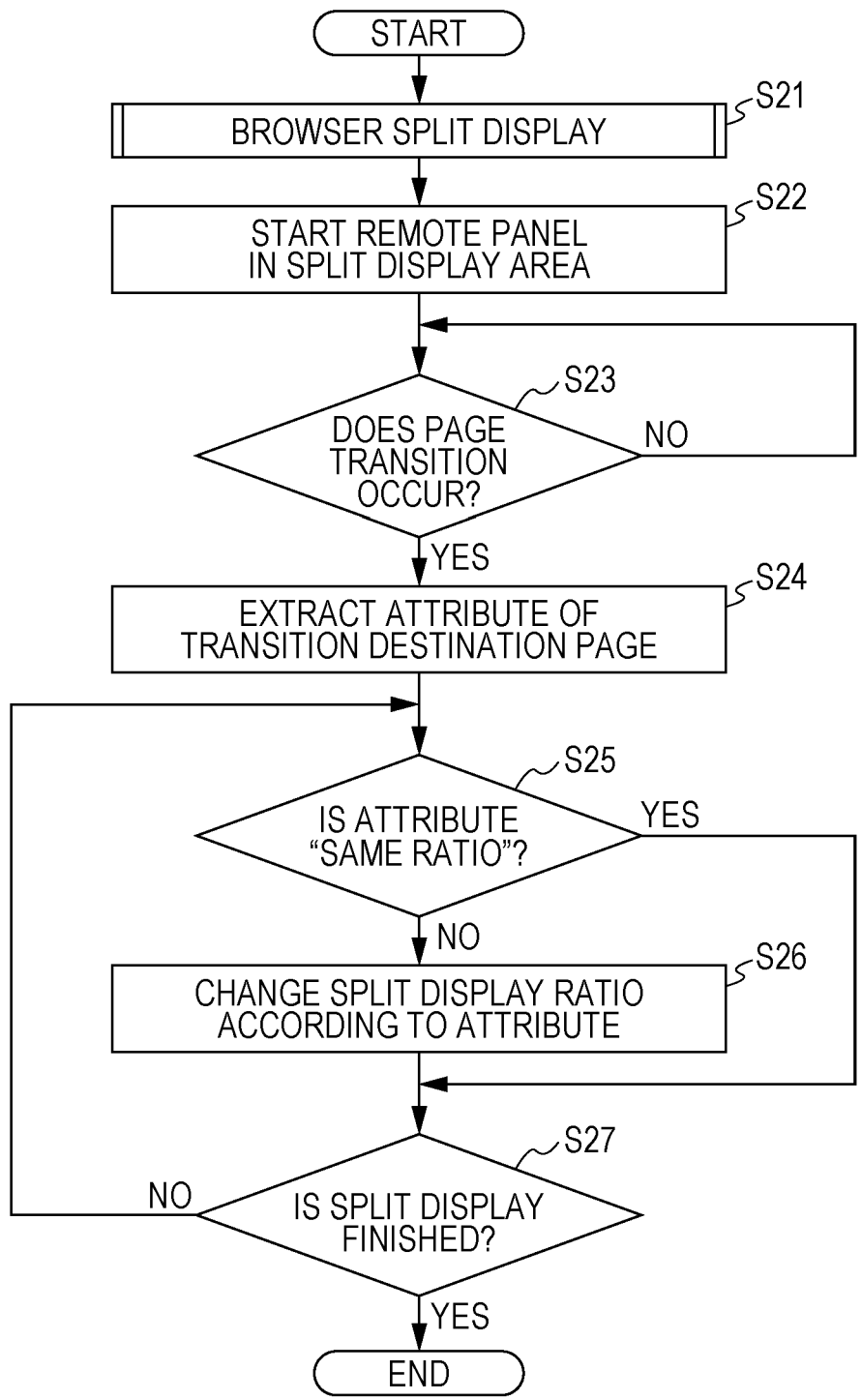
FIG. 9 is a flowchart illustrating an example of a procedure of a changing process of the screen display ratio at the time of the browser split display.

Herein, a process of changing the screen display ratio at the time of the browser split display is described with reference to FIG. 9. FIG. 9 is a flowchart illustrating an example of a procedure of the changing process of the screen display ratio at the time of the browser split display. The displaying process is executed under the control of a CPU 191 of a main body controller 19 (refer to FIG. 2).

In the flowchart in FIG. 9, a process of displaying the browser in a split manner at step S21 corresponds to the processes at steps S11 to S14 in FIG. 6 and a process at step S22 corresponds to step S15 in FIG. 6. According to this, the user manual screen 31 and the remote panel screen 32 are displayed on the browser in a split manner.

Subsequently, the CPU 191 monitors whether page transition of the HTML content (in a case of this example, the user manual) occurs (step S23). A monitoring process is executed by repeating a loop of NO at step S23. When the CPU 191 determines that the page transition of the HTML content occurs (YES at S23), this extracts the attribute of the screen display ratio of a transition destination (step S24), then determines whether the extracted attribute is "same ratio" (step S25).

When the attribute is not "same ratio" (NO at S25), the CPU 191 changes the screen display ratio according to the extracted attribute (step S26), and when the attribute is "same ratio" (YES at S25), this bypasses the process at step S26 to shift to a process at step S27. At step S27, the CPU 191 determines whether the split display is finished, and when the split display is not finished (NO at S27), this returns to step S25 to repeatedly execute the processes at steps S25 to S27. When the CPU 191 determines that the split display is finished (YES at S27), this finishes a series of processes for changing the screen display ratio at the time of the browser split display.

SECOND EXAMPLE

A second example is an example in which operation related to a remote panel screen is linked with operation related to an HTML content screen. According to the second example, when a user manual screen 31 being an example of the HTML content screen is operated, for example, at the time of split display (simultaneous display), operation of an operating unit 11, that is to say, the operation related to a remote panel screen 32 is automatically performed along with an operation content.

First, a case in which the operation related to the remote panel screen 32 is linked with the operation related to the user manual screen 31 is described as a second example (1). As an example, a case of specifying a copying function in the user manual screen 31 and browsing a method of transition to a copy applied setting screen as illustrated in FIG. 10 is described.

FIG. 10 is a view illustrating a display example of the second example (1) in which the operation related to the remote panel screen 32 is linked with the operation related to the user manual screen 31. FIG. 11 illustrates another example of the remote panel screen 32 in FIG. 10 in an enlarged manner. The remote panel screen 32 herein illustrated is a setting screen of the copying function of forming an image on paper. However, the display example of the remote panel screen 32 herein illustrated is merely an example and this is not limited to this display example.

In the second example (1), the following processes (1) to (4) are executed. (1) An entry of the copying function is selected as indicated by an arrow in FIG. 10 from a table of contents of the user manual screen 31. (2) The user manual screen 31 transits to a description page of the copying function.

At that time, in FIG. 3, a browser controller 22 detects transition to the description page of the copying function and transmits information of the operation of the operating unit 11 to an operating unit controller 21. Specifically, an operated coordinate and the operation information are transmitted from the browser controller 22 to the operating unit controller 21. In a case of this example, information that the coordinate in which a copy tab is located is touched is transmitted, and a screen of the operating unit 11, that is to say, the remote panel screen 32 transits to a copy screen. (3) Subsequently, an entry of detailed setting is selected from the page of the copying function of the user manual screen 31. (4) As in (2), the page of the user manual screen 31 transits to an applied setting page, information that the coordinate of an applied setting button is touched is transmitted to the operating unit controller 21, and display of the operating unit. 11 transits to the applied setting screen.

Subsequently, a case in which the operation related to the user manual screen 31 is linked with the operation related to the remote panel screen. 32, specifically, a case in which page switching of the user manual is linked with the screen transition by the operation of the remote panel is described as a second example (2)

Figure 12:
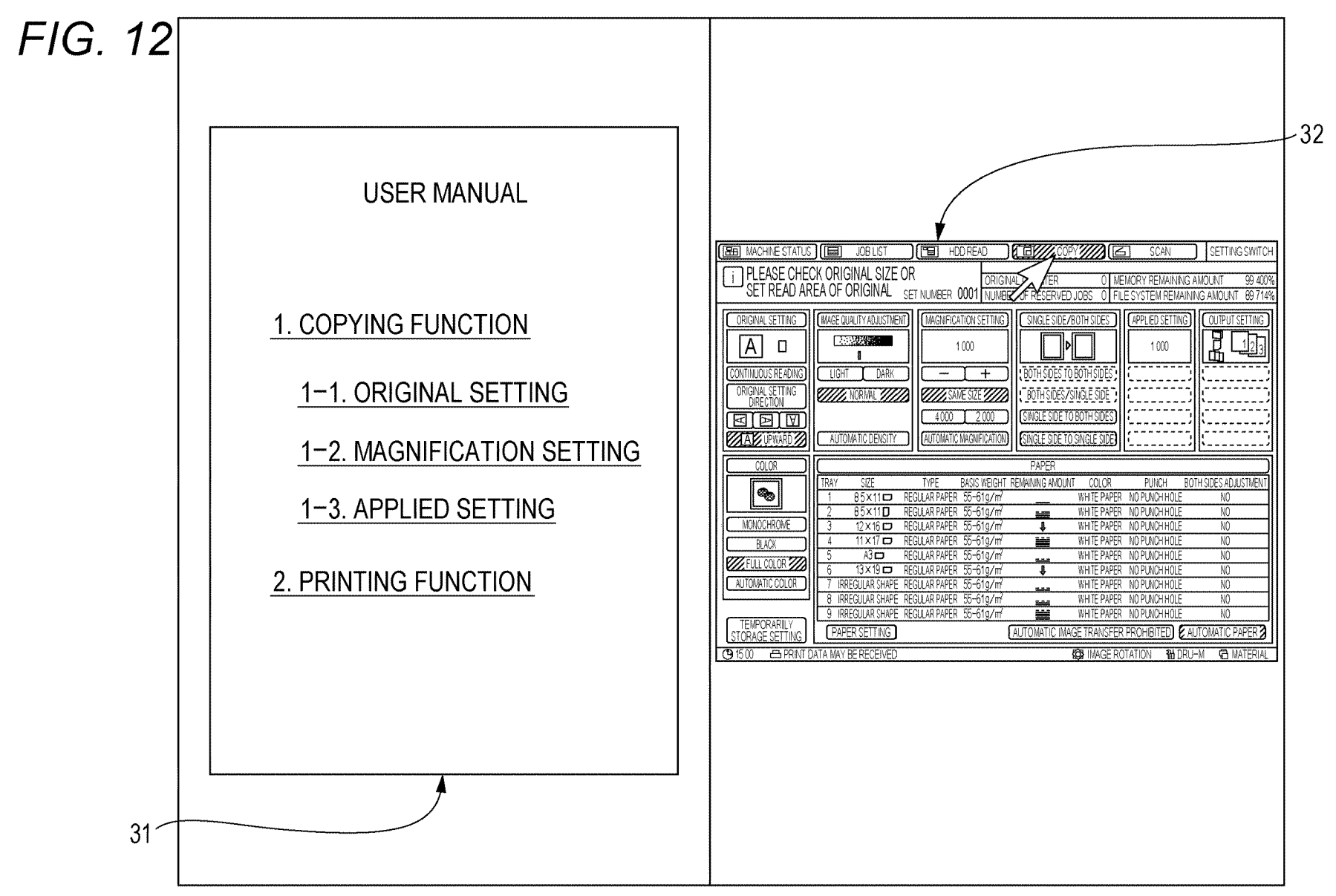

As an example, a case in which the corresponding page of the user manual is automatically displayed at the time of the transition to the copy applied setting screen by operation of a "copy" area R104 of the remote panel screen 32 (refer to FIG. 11) is described. FIG. 12 is a view illustrating a display example of the second example (2) in which the operation related to the user manual screen 31 is linked with the operation related to the remote panel screen 32.

In the second example (2), the following processes (1) to (4) are executed (1) At the time of browser split display, the "copy" area R104 of the remote panel screen 32 is pressed for transition to the copy screen as indicated by an arrow in FIG. 12. (2) At that time, in FIG. 3, the operating unit controller 21 detects the transition of the screen and notifies the browser controller 22 of the transition to the copy screen. The browser controller 22 notified by the operating unit controller 21 recognizes of occurrence of the transition to the copy screen and allows the transition of the user manual screen 31 to a copy screen description page. (3) Subsequently, a detailed setting button (not illustrated) of the remote panel screen 32 is pressed for transition to a detailed setting screen. (4) As in (2), the browser controller 22 is notified of the transition to the detailed setting screen and the user manual screen. 31 transits to a detailed setting description page.

Figure 13:
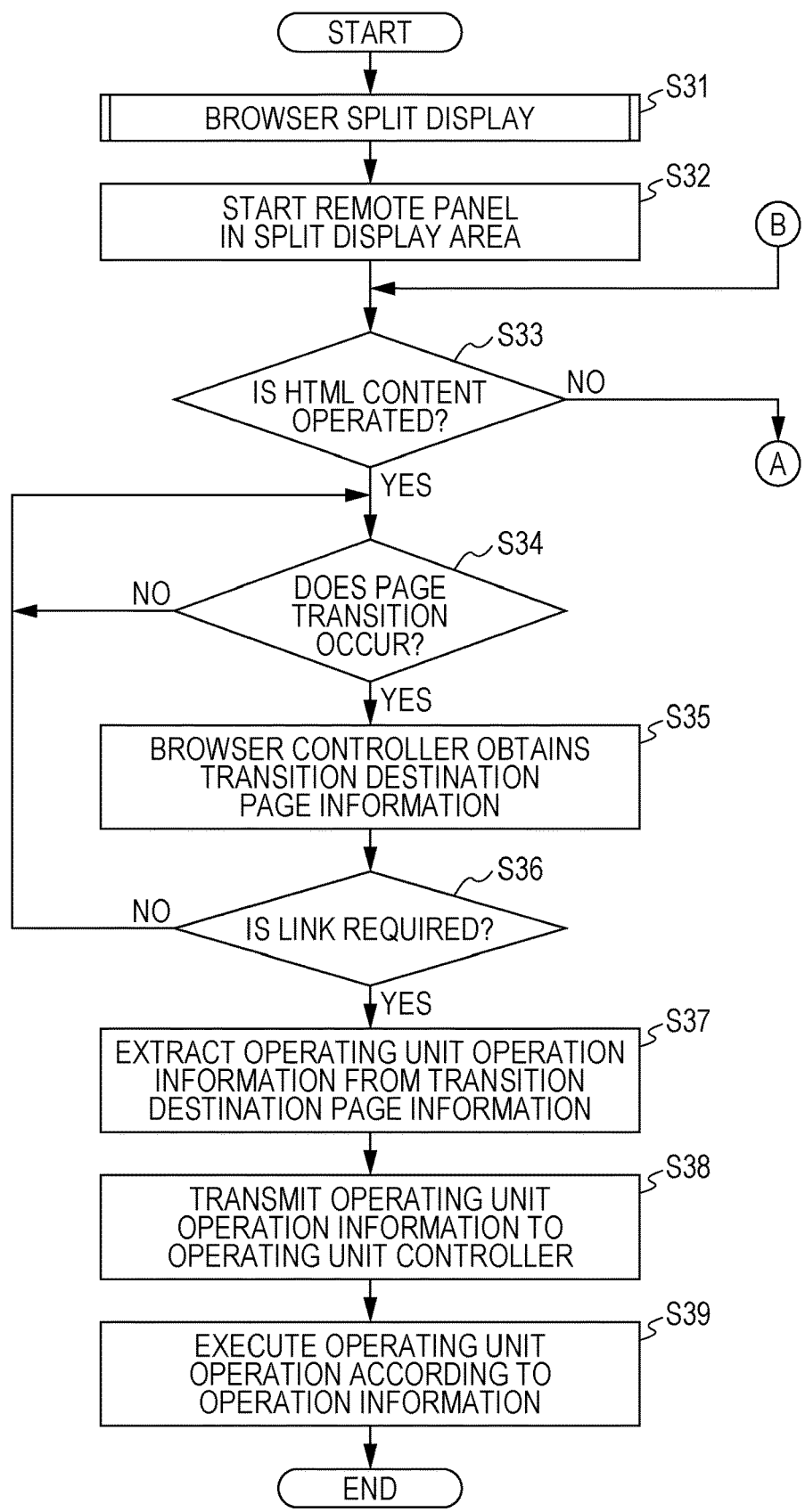
FIG. 13 is a flowchart (1) illustrating an example of a procedure of a displaying process of the second example in which the operation related to the remote panel screen is linked with the operation related to an HTML content screen.
Figure 14:
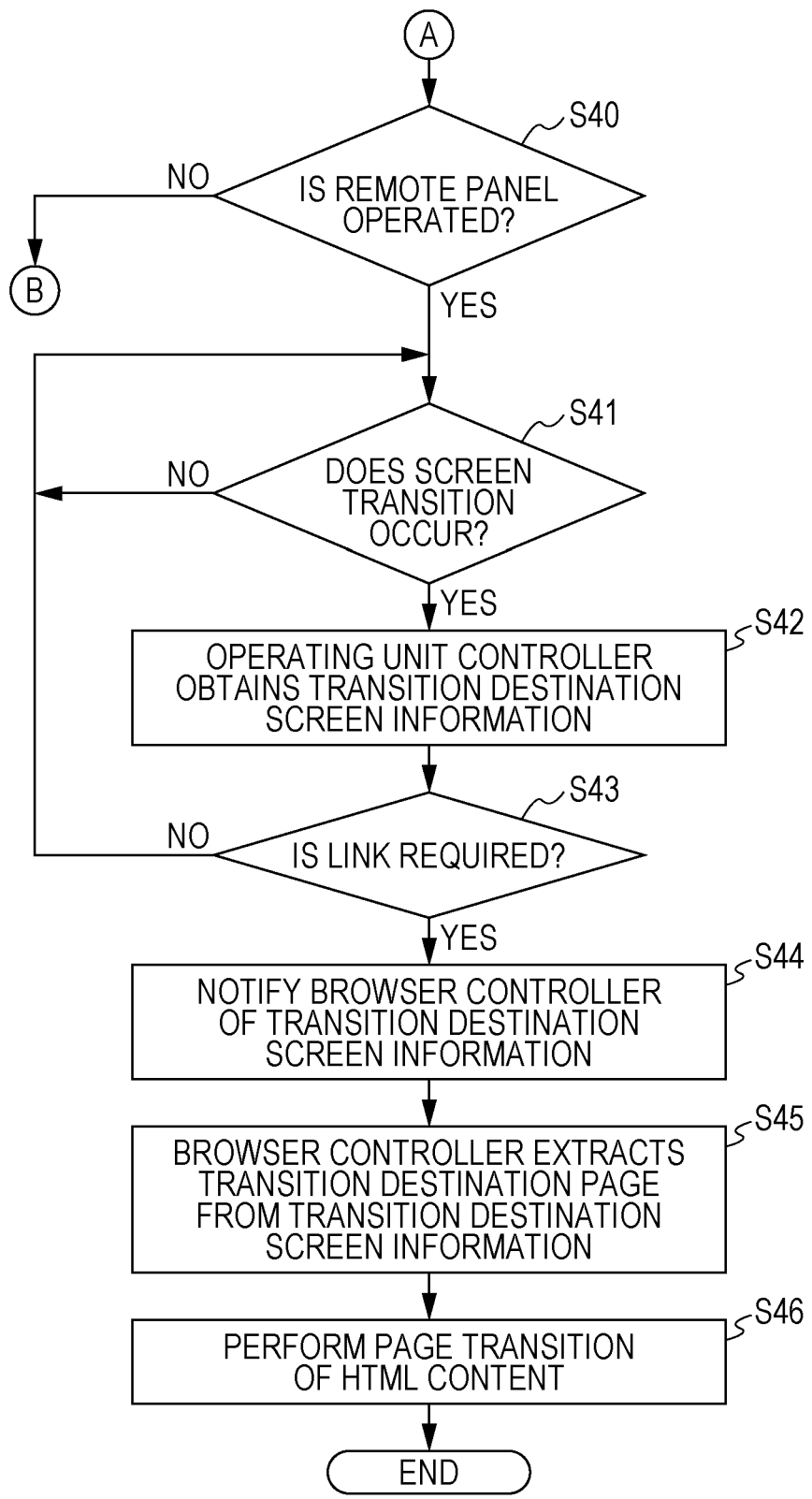
FIG. 14 is a flowchart (2) illustrating an example of the procedure of the displaying process of the second example in which the operation related to the remote panel screen is linked with the operation related to the HTML content screen.

FIGS. 13 and 14 are flowcharts illustrating an example of a procedure of the displaying process of the second example in which the operation related to the remote panel screen is linked with the operation related to the HTML content screen. The displaying process is executed under the control of a CPU 191 of a main body controller 19 (refer to FIG. 2).

In the flowchart in FIG. 13, a process of displaying a browser in a split manner at step S31 corresponds to processes at steps S11 to S14 in FIG. 6 and a process at step S32 corresponds to step S15 in FIG. 6. According to this, the user manual screen 31 and the remote panel screen 32 are displayed on the browser in a split manner.

Subsequently, the CPU 191 determines whether HTML content (user manual, in a case of this example) is operated (step S33), and when this determines that the HTML content is operated (YES at S33), this monitors whether the page transition of the HTML, content occurs (step S34). If the page transition of the HTML content occurs (YES at S34), the browser controller 22 obtains transition destination page information (step S35).

Next, the CPU 191 determines whether the operating unit is required to be linked, that is to say, whether it is required to link the operation related to the remote panel screen. 32 with the operation related to the user manual screen. 31 (step S36), and when the link is not required (NO at 536), this returns to step S34. When the link is required. (YES at S36), the CPU 191 extracts operating unit operation information from the transition destination page information (step S37), then transmits the operating unit operation information to the operating unit controller 21 (step S38). Then, the CPU 191 executes the operation of the operating unit 11 according to the operating unit information (step S39) and finishes a series of processes.

On the other hand, when the CPU 191 determines that the HTML content is not operated at step S33 (NO at S33), this shifts to step S40 in FIG. 14 to determine whether the remote panel is operated. When the CPU 191 determines that the remote panel is not operated (NO at S40), this returns to step S33 in FIG. 13 to determine whether the HTML content is operated.

When the CPU 191 determines that the remote panel is operated (YES at S40), this monitors whether the screen transition occurs by the remote panel operation (step S41). This monitoring process is executed by repeating a loop of NO at step S41. If the screen transition by the remote panel operation occurs (YES at S41), the operating unit controller 21 obtains transition destination screen information (step S42).

Subsequently, the CPU 191 determines whether the HTML content is required to be linked, that is to say, whether it is required to link the operation related to the user manual screen 31 with the operation related to the remote panel screen. 32 (step S43), and when the link is not required (NO at S43), this returns to step S41. When the link is required (YES at S43), the CPU 191 notifies the browser controller 22 of the transition destination screen information. (step S44) and the browser controller 22 extracts a transition destination page from the transition destination screen information in response to this (step S45). Then, the CPU 191 performs the page transition of the HTML content (step S46) and finishes a series of processes.

As described above, according to the second example, the screen of the operating unit 11 is simultaneously and automatically operated when a method of using the function is searched on the user manual screen 31, and in contrast, when the screen of the operating unit 11 is operated by using the remote panel screen 32, the corresponding page of the user manual screen 31 is automatically displayed. Therefore, it is possible to simultaneously browse the user manual being an example of the HTML content and operate the operating unit 11 without troublesome operation to alternatively perform the page operation of the user manual screen 31 and the operation of the operating unit 11.

Meanwhile, although the simultaneous display (half-split display) of the remote panel and the user manual is described as an example in this example, the user manual as the HTML content is merely an example. In addition to the user manual, it is also possible to simultaneously display a service assistant tool, an advertising display screen saver and the like with the remote panel, for example, and allow the operations related to them to link with each other.

[Control Program]

Various processes executed under the control of the CPU 191 of the main body controller 19 described, above is executed by an instruction of a program to the CPU 191 being an example of a computer. It is considered to install in advance a processing program (control program of the present invention) which allows the CPU 191 to execute the various processes in a storage unit provided on an image forming device 1, for example, a ROM 192 of the main body controller 19 (refer to FIG. 2) However, there is no limitation, and it is also possible to provide the processing program by wired or wireless communicating means and store the processing program. In a storage medium such as computer-readable IC card, USB memory and the like to provide.

[Variation]

Although the present invention is described above by using the embodiment, the present invention is not limited to the description of the embodiment above. That is to say, the above-described embodiment may be variously changed or modified without departing from the gist of the present invention and the embodiment with such change or modification may also be included in the technical field of the present invention.

For example, although the remote panel screen and the content screen are displayed in a split manner under startup of one browser (same browser) in the above-described embodiment, it is also possible to display the remote panel screen and the content screen in a split manner under startup of different browsers.

According to an embodiment of the present invention, it is possible to operate and browse the operating unit while looking at the content screen in the data description language, so that operability of the image forming device is improved.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming device comprising:
a display device configured to display a display screen displayed by a browser; and
a hardware processor configured to:
display screen data on the display screen, the screen data reflecting a remote panel screen which is displayed on a screen of a remote terminal device allowing the remote terminal device to remotely operate the image forming device;
display a content screen on the display screen, the content screen reflecting content data represented by a data description language and being an image of informational material from a user manual that provides instructions regarding operation of the remote panel screen; and
display the remote panel screen and the content screen in the display screen in a split manner, wherein
the hardware processor is configured to link operation related to the remote panel screen with operation related to the content screen that is the image of informational material so that the user manual provides the instructions to a user about how to operate the remote panel screen being displayed,
the hardware processor linking operation of the remote panel screen with the operation related to the content screen such that the content screen is automatically changed to a new image of informational material from the user manual in accordance with the remote panel screen changing to a new remote panel screen,
the hardware processor is configured to display the remote panel screen and the content screen with a fixed aspect ratio selected by the user by:
extracting an aspect ratio of a transition destination page every time the content screen changes,
determining whether the aspect ratio of the transition destination page is different than a previous content screen, and
changing the aspect ratio of the transition destination page to the fixed aspect ratio when it is determined that the aspect ratio of the transition destination page is different.

2. The image forming device according to claim 1, wherein the hardware processor is configured to display the remote panel screen and the content screen in the display screen in a split manner when a specific key of a hard key of the operating unit is operated while the content screen is displayed on the display screen.

3. The image forming device according to claim 1, wherein
content in the data description language has an attribute related to a screen display ratio at the time of split display for each page, and
the hardware processor is configured to change the screen display ratio between the remote panel screen and the content screen at the time of the split display according to the attribute.

4. The image forming device according to claim 3, wherein the screen display ratio is determined in advance for each attribute.

5. The image forming device according to claim 4, wherein the hardware processor is configured to change the screen display ratio determined in advance for each attribute according to an instruction by a user.

6. The image forming device according to claim 1, wherein
when operation related to the content screen is performed while the remote panel screen and the content screen are displayed in a split manner, the hardware processor transmits a control instruction to an operating unit controller of the image forming device according to operation content of the operation to allow the operating controller to perform operation of a screen of the operating unit.

7. The image forming device according to claim 1, wherein
when operation related to the remote panel screen is performed and screen transition of the display screen occurs while the remote panel screen and the content screen are displayed in a split manner, the hardware processor transmits transition destination screen information to a browser controller of the image forming device to allow transition of the content screen to a page corresponding to the transition destination screen information.

8. A non-transitory recording medium storing a computer readable control program of an image forming device comprising a display screen which allows a computer to execute:
a process of displaying screen data on the display screen, the screen data reflecting a remote panel screen which is displayed on a screen of a remote terminal device allowing the remote terminal device to remotely operate the image forming device;
a process of displaying a content screen on the display screen, the content screen reflecting content data represented by a data description language and being an image of informational material from a user manual that provides instructions regarding operation of the remote panel screen; and
a process of displaying the remote panel screen and the content screen in the display screen in a split manner, wherein the displaying of the remote panel screen and the content screen in the display screen in the split manner includes linking operation related to the remote panel screen with operation related to the content screen so that the user manual provides the instructions to a user about how to operate the remote panel screen being displayed, and the linking operation of the remote panel screen with the operation related to the content screen comprises automatically changing the content screen to a new image of informational material from the user manual in accordance with the remote panel screen changing to a new remote panel screen;

the remote panel screen and the content screen being displayed with a fixed aspect ratio selected by the user by:
- extracting an aspect ratio of a transition destination page every time the content screen changes,
- determining whether the aspect ratio of the transition destination page is different than a previous content screen, and
- changing the aspect ratio of the transition destination page to the fixed aspect ratio when it is determined that the aspect ratio of the transition destination page is different.

9. The non-transitory recording medium according to claim 8, wherein the remote panel screen and the content screen are displayed in the display screen in the split manner when a specific key of a hard key of the operating unit is operated while the content screen is displayed on the display screen.

10. The non-transitory recording medium according to claim 8, wherein
content in the data description language has an attribute related to a screen display ratio at the time of split display for each page, and
the displaying of the remote panel screen and the content screen in the display screen in the split manner includes changing the screen display ratio between the remote panel screen and the content screen at the time of the split display according to the attribute.

11. The non-transitory recording medium according to claim 10, wherein the screen display ratio is determined in advance for each attribute.

12. The non-transitory recording medium according to claim 11, wherein the displaying of the remote panel screen and the content screen in the display screen in the split manner includes changing the screen display ratio determined in advance for each attribute according to an instruction by a user.

13. The non-transitory recording medium according to claim 8, wherein when operation related to the content screen is performed while the remote panel screen and the content screen are displayed in a split manner, the computer readable program allows the computer to execute transmitting a control instruction to an operating unit controller of the image forming device according to operation content of the operation to allow the operating controller to perform operation of a screen of the operating unit.

14. The non-transitory recording medium according to claim 8, wherein when operation related to the remote panel screen is performed and screen transition of the display screen occurs while the remote panel screen and the content screen are displayed in the split manner, the computer readable program allows the computer to execute transmitting transition destination screen information to a browser controller of the image forming device to allow transition of the content screen to a page corresponding to the transition destination screen information.

\* \* \* \* \*